United States Patent
Sundaram et al.

(10) Patent No.: US 9,166,778 B2
(45) Date of Patent: Oct. 20, 2015

(54) SECURE GROUP MESSAGING

(75) Inventors: Ganapathy S. Sundaram, Hillsborough, NJ (US); Ioannis Broustis, Millburn, NJ (US); Violeta Cakulev, Millburn, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 148 days.

(21) Appl. No.: 13/548,835

(22) Filed: Jul. 13, 2012

(65) Prior Publication Data

US 2013/0182848 A1    Jul. 18, 2013

Related U.S. Application Data

(60) Provisional application No. 61/511,845, filed on Jul. 26, 2011, provisional application No. 61/508,168, filed on Jul. 15, 2011.

(51) Int. Cl.
    *H04L 9/08*      (2006.01)
    *H04L 9/30*      (2006.01)

(52) U.S. Cl.
    CPC ............... *H04L 9/08* (2013.01); *H04L 9/0833* (2013.01); *H04L 9/0847* (2013.01); *H04L 9/3073* (2013.01)

(58) Field of Classification Search
None
See application file for complete search history.

(56) References Cited

U.S. PATENT DOCUMENTS 5,159,632 A    10/1992   Crandall
6,769,060 B1 *   7/2004   Dent et al. .................... 713/168
7,353,395 B2 *   4/2008   Gentry et al. ................. 713/171
7,853,016 B2 *   12/2010   Gentry ............................ 380/45
8,644,510 B2 *   2/2014   Cakulev et al. ............... 380/255
2004/0162983 A1 *   8/2004   Gotoh et al. .................. 713/171
2009/0225986 A1 *   9/2009   Gennaro et al. .............. 380/278

(Continued)

FOREIGN PATENT DOCUMENTS

JP            H088895 A     1/1996
WO     WO2011031436 A2    3/2011
WO   PCT/US2012/046704    10/2012

OTHER PUBLICATIONS

Yantao, Zhong; Jianfeng, Ma, "A highly secure identity-based authenticated key-exchange protocol for satellite communication," Communications and Networks, Journal of , vol. 12, No. 6, pp. 592,599, Dec. 2010.*

(Continued)

*Primary Examiner* — Jeffery Williams
(74) *Attorney, Agent, or Firm* — Ryan, Mason & Lewis, LLP

(57) ABSTRACT

A method for securing at least one message transferred in a communication system from a first computing device to a second computing device in a peer-to-peer manner. At the first computing device, an identity based authenticated key exchange session is established with a third computing device operating as a peer authenticator. The identity based authenticated key exchange session has an identity based authenticated session key associated therewith. The first computing device obtains from the third computing device a random key component of the second computing device, wherein the random key component of the second computing device is encrypted by the third computing device using the identity based authenticated session key prior to sending the random key component of the second computing device to the first computing device. A peer-to-peer messaging key is computed at the first computing device using the random key component of the second computing device.

13 Claims, 4 Drawing Sheets

(56) References Cited

U.S. PATENT DOCUMENTS

| | | | |
|---|---|---|---|
| 2010/0208895 A1* | 8/2010 | Boneh et al. | 380/278 |
| 2010/0211779 A1 | 8/2010 | Sundaram | |
| 2011/0051912 A1* | 3/2011 | Sundaram et al. | 379/93.02 |
| 2012/0288092 A1* | 11/2012 | Cakulev et al. | 380/255 |

OTHER PUBLICATIONS

X. Boyen et al., "Identity-Based Cryptography Standard (IBCS) #1: Supersingular Curve Implementations of the BF and BB1 Cryptosystems," Network Working Group, Request for Comments: 5091, Dec. 2007, 57 pages.

G. Appenzeller et al., "Identity-Based Encryption Architecture and Supporting Data Structures," Network Working Group, Request for Comments: 5408, Jan. 2009, 27 pages.

V. Cakulev et al., "IBAKE: Identity-Based Authenticated Key Exchange," Network Working Group, Internet-Draft, draft-cakulev-ibake-04.txt, Apr. 2011, 15 pages.

V. Cakulev et al., "MIKEY-IBAKE: Identity-Based Authenticated Key Exchange (IBAKE) Mode of Key Distribution in Multimedia Internet KEYing (MIKEY)," Internet Engineering Task Force (IETF), Request for Comments: 6267, Jun. 2011, 27 pages.

D. Boneh et al., "Identity-Based Encryption from the Weil Pairing," Advances in Cryptology—CRYPTO, Lecture Notes in Computer Science (LNCS) 2139, Aug. 2001, pp. 213-229.

X. Yi, "Identity-Based Fault-Tolerant Conference Key Agreement," IEEE Transactions on Dependable and Secure Computing, Jul.-Sep. 2004, pp. 170-173, vol. 1, No. 3.

* cited by examiner

SECURE GROUP MESSAGING

CROSS REFERENCE TO RELATED APPLICATION

The present application claims priority to the U.S. Provisional Applications identified as: (1) Ser. No. 61/508,168, filed on Jul. 15, 2011, and entitled "Secure Group Messaging;" and (2) Ser. No. 61/511,845, filed on Jul. 26, 2011, and entitled "Secure Group Messaging," the disclosures of which are both incorporated by reference herein in their entirety.

FIELD

The present application relates generally to communication security and, more particularly, to secure group messaging in a communication system.

BACKGROUND

Messaging services, as are known today, had their origins in Instant Messaging (IM), which started prior to the advent of the World Wide Web. Since then, the concept of messaging has undergone a healthy and continued evolution while maintaining its status as a very popular application program across many communication systems. More recent extensions include chat rooms and micro blogging with a social network aspect (e.g., Twitter). Extensions of these messaging services are being adopted inside enterprise environments as well. Over mobile networks, conventional messaging services include short message service (SMS) and multimedia message service (MMS). Simultaneously, messaging services have also served as a platform to offer various value added services such as ringtones and wallpaper downloads. Given the unprecedented growth and adoption of smart phones, mobile messaging services are also undergoing a rapid evolution, which includes mobile versions of micro blogging, enterprise mobile messaging services, and group messaging services.

In all the above examples, there are participants and a messaging provider (who could be different from the provider of the communication network infrastructure, i.e., network provider, within which the messaging service is hosted). Moreover, all messages traverse the network with little or no support for security even though messages are stored in various servers before delivery. In particular, messages are seldom encrypted or authenticated. The only form of security that may be available is encryption and/or integrity protection over an access link (such as mobile wireless). Even in these limited settings, access network providers often "turn off" security features to conserve computing power.

SUMMARY

Embodiments of the invention provide secure group messaging techniques with identity based cryptography for use in a communication system.

For example, in a first embodiment, a method comprises the following steps. The method is for securing at least one message transferred in a communication system from a first computing device to a second computing device in a peer-to-peer manner. At the first computing device, an identity based authenticated key exchange session is established with a third computing device operating as a peer authenticator. The identity based authenticated key exchange session has an identity based authenticated session key associated therewith. The first computing device obtains from the third computing device a random key component of the second computing device, wherein the random key component of the second computing device is encrypted by the third computing device using the identity based authenticated session key prior to sending the random key component of the second computing device to the first computing device. A peer-to-peer messaging key is computed at the first computing device using the random key component of the second computing device. At least one message is sent from the first computing device intended for the second computing device via a fourth computing device operating as a messaging server, wherein the at least one message is encrypted using the peer-to-peer messaging key prior to sending.

In a second embodiment, a method comprises the following steps. The method is for securing at least one message transferred in a communication system from a first computing device to a second computing device and at least a third computing device, wherein the first, second and third computing devices form a predetermined group. At the first computing device, an identity based authenticated key exchange session is established with a fourth computing device operating as a group authenticator. The identity based authenticated key exchange session having an identity based authenticated session key associated therewith. The first computing device obtains from the fourth computing device a random key component of the second computing device and a random key component of the third computing device, wherein the random key components of the second and third computing devices are encrypted by the fourth computing device using the identity based authenticated session key prior to sending the random key components to the first computing device. At the first computing device, a group key component is computed for the first computing device using the random key components of the second and third computing devices. The group key component for the first computing device is sent from the first computing device intended for the fourth computing device. Respective group key components are obtained for the second and third computing devices from the fourth computing device. A group messaging key is computed at the first computing device using the group key components of the first, second and third computing devices. At least one message is sent from the first computing device intended for the second and third computing devices via a fifth computing device operating as a messaging server, wherein the at least one message is encrypted using the group messaging key prior to sending.

Advantageously, only the computing devices in the peer-to-peer relationship or the computing devices in the predetermined group are able to decrypt the at least one message. Also, the secure message can be created and sent even if one or more of the recipients are offline from the communication system.

These and other objects, features and advantages of the present invention will become apparent from the following detailed description of illustrative embodiments thereof, which is to be read in connection with the accompanying drawings.

DETAILED DESCRIPTION

Figure 1:
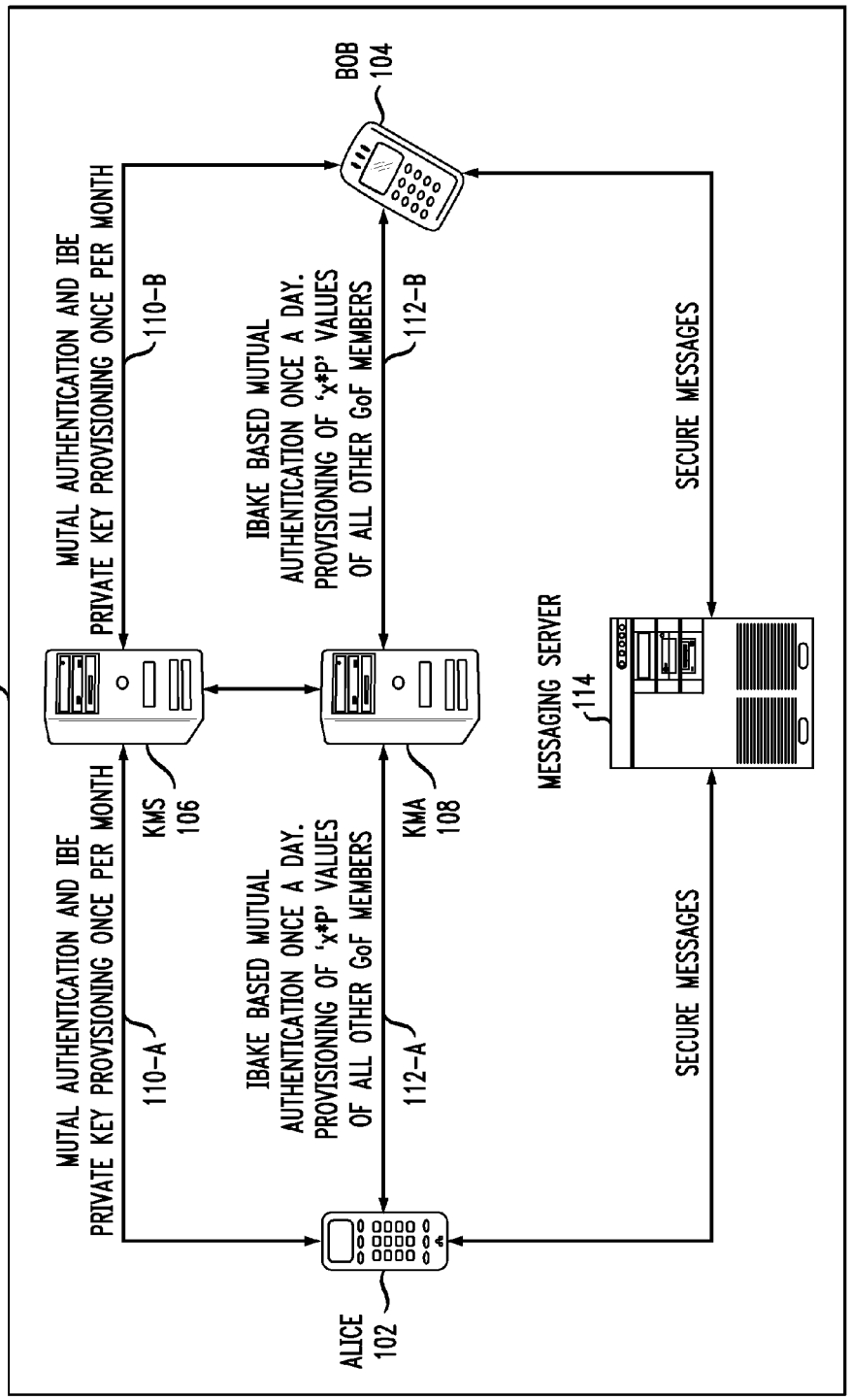
FIG. 1 illustrates a communication system implementing secure group messaging according to an embodiment of the invention.

The phrase "communication system" as used herein is generally defined as any communication system or network capable of transporting one or more types of media including, but not limited to, text-based data, graphics-based data, voice-based data and video-based data.

The term "key" as used herein is generally defined as an input to a cryptographic primitive and/or protocol, for purposes such as, but not limited to, entity authentication, privacy, message integrity, encryption/decryption, etc.

Further, the phrase "security association" as used herein is generally defined as cryptographic or security data (e.g., one or more keys) generated for the purposes of authenticating an entity to a communication system.

Also, as used herein, a "server" is generally defined as one or more computing devices and/or software programs thereon that perform one or more functions (e.g., services) upon request from a communication network, a client and/or another server. It is to be further understood that a "node" may refer to a dedicated computing device in the communication system or it may refer to a functional part of a computing device that performs one or more other functions.

A "client," as used herein, is generally defined as one or more computing devices and/or software programs thereon that request one or more functions (e.g., services) from a communication network, a server, and/or another client. Examples of client devices may include, but are not limited to, cellular phones, smart phones, desktop phones, personal digital assistants, laptop computers, personal computers, etc. Also, a computing device may be a server for one purpose and a client for another purpose.

The term "message," as used herein, is generally defined as any form of data or information that one party wishes to communicate to another party. The data or information can include one or more types of media including, but not limited to, text-based data, graphics-based data, voice-based data and video-based data. Other forms of data may also be part of a message. The context of a message may be personal, business, a combination thereof, or some other context.

The term "offline," as used herein with respect to a computing device, is generally defined as not being connected to and/or not accessing a communication system. Thus, the term "online," as used herein with respect to a computing device, is generally defined as being connected to and/or accessing a communication system.

For ease of reference, the detailed description is divided as follows. Section I describes general principles of identity based encryption (IBE) and identity based authenticated key exchange (IBAKE) operations. Section II describes secure group messaging solutions according to illustrative embodiments of the invention. Section III describes an illustrative computing system for implementing one or more secure group messaging protocols according to the invention.

I. Identity Based Encryption (IBE) and Identity Based Authenticated Key Exchange (IBAKE)

Prior to an explanation of illustrative embodiments of secure group messaging techniques of the invention, general principles of IBE and IBAKE are described.

A. Identity Based Encryption

An Identity Based Encryption (IBE) protocol was presented by Boneh and Franklin, see Dan Boneh, Matthew K. Franklin, "Identity-Based Encryption from the Weil Pairing" Advances in Cryptology—Proceedings of CRYPTO 2001 (2001), the disclosure of which is incorporated by reference herein. This asymmetric cryptographic encryption protocol allows participants to use an 'identity' (example: email-id, or domain name) as the public key and eliminates the need for large scale public key infrastructure which is often associated with public key encryption methods such as RSA (Rivest, Shamir and Adleman). Boneh and Franklin's approach to the problem uses bilinear maps on an elliptic curve over a finite field, and relies on the bilinear decisional Diffie-Hellman problem.

IBE involves the following mathematical tools and parameters:

Let E be an elliptic curve over a finite field F, and let P be a point of large prime order.

Let $e: E \times E \rightarrow G$ be a bi-linear map on E. The typical example is the Weil pairing, and hence G will be the group of n-th roots of unity where n is a function of the number of points on E over F.

Let s be a non-zero positive integer and be a secret stored in a Key Generation Function (KGF). This is a system-wide secret and not revealed outside the KGF.

Let $P_{pub}=sP$ be the public key of the system that is known to all participants. Recall sP denotes a point in E, since E is a group.

Let $H_1$ be a known hash function that takes a string and assigns it to a point on the elliptic curve, i.e., $H_1(A)=Q_A$ on E, where A is usually the identity, and is also the public key of A.

Let $d_A=sQ_A$ be the private key computed by the KGF and delivered only to A.

Let $H_2$ be a known hash function that takes an element of G and assigns it to a string.

Let m be a message that has to be encrypted and sent to A. The encryption function described by Boneh and Franklin is as follows:

Let $g_A=e(Q_A, P_{pub})$, and let r be a random number.

$\text{Encryption}_A(m)=(rP, m \text{ xor } H_2(g_A{}^r))$; in other words the encryption output of m has two coordinates u and v where $u=rP$ and $v=m \text{ xor } H_2(g_A{}^r)$. Note that "xor" refers to the exclusive OR logic function.

In order to decrypt (u,v), A recovers m using the following formula:

$$m = v \text{ xor } H_2(e(d_A, u)).$$

The proof of the formula is a straight forward exercise in bilinear maps, and the fact A has the secret $d_A$ (private key known only to A but not other participants). Also observe that the KGF, which computed $d_A$ in the first place, can also decrypt the message resulting in the KGF being a de-facto key escrow server.

Further details of the IBE protocol are described in Internet Engineering Task Force (IETF) Request for Comments (RFC) 5091 authored by X. Boyen et al. and entitled "Identity-Based Cryptography Standard (IBCS) #1: Supersingular Curve Implementations of the BF and BB1 Cryptosystems," December 2007; and IETF RFC 5408 authored by G. Appenzeller et al. and entitled "Identity-Based Encryption Architecture and Supporting Data Structures," January 2009, the disclosures of which are both incorporated by reference herein in their entireties.

B. Identity Based Authenticated Key Exchange

Identity Based Authenticated Key Exchange (IBAKE) is described in the U.S. patent application identified by Ser. No.

12/372,242, filed on Feb. 17, 2009, the disclosure of which is incorporated by reference herein in its entirety. The IBAKE protocol allows devices to mutually authenticate each other, and derive a key that provides perfect forwards and backwards secrecy.

In the IBAKE embodiment described here, the basic set up for this protocol involves the mathematical constructs and parameters discussed above in subsection A. Note that this protocol is asymmetric but does not require any Public Key Infrastructure (PKI) support; instead the protocol employs an offline server which serves as a Key Generation Function. The details of the protocol are outlined below:

Suppose A, B are the two entities (or parties, where A represents a computer system of a first party and B represents a computer system of a second party) that are attempting to authenticate and agree on a key.

We will use A and B to represent their corresponding identities, which by definition also represent their public keys.

Let $H_1(A)=Q_A$ and $H_1(B)=Q_B$ be the respective points on the elliptic curve corresponding to the public keys. In effect, one could refer to $Q_A$ and $Q_B$ as the public keys as well, since there is a one-to-one correspondence between the identities and the points on the curve obtained by applying $H_1$.

Let x be a random number chosen by A, and let y be a random number chosen by B.

The protocol exchanges between A and B comprises of the following steps:

A computes xP (i.e., P added to itself x times as a point on E, using the addition law on E), encrypts it using B's public key, and transmits it to B in a first step. In this step, encryption refers to identity based encryption described in subsection A above.

Upon receipt of the encrypted message, B decrypts the message and obtains xP. Subsequently B computes yP, and encrypts the pair {xP, yP} using A's public key and then transmits it to A in a second step.

Upon receipt of this message, A decrypts the message and obtains yP. Subsequently, A encrypts yP using B's public key and sends it back to B in a third step.

Following this, both A and B compute xyP as the session key.

Observe that A chose x randomly, and received yP in the second step of the protocol exchange. This allows A to compute xyP by adding yP to itself x times. Conversely, B chose y randomly, and received xP in the first step of the protocol exchange. This allows B to compute xyP by adding xP to itself y times. Note that any application of the protocol may utilize header data with the identities to ensure proper functioning of the protocol. This is relatively standard and applicable to almost any protocol exchange for key agreement.

Note also that x is random but xP provides no information about x. Therefore, xP is a component of a key based on a random secret chosen by A. Likewise, y is random but yP provides no information about y. Hence, yP is a component of a key based on a random secret known only to B.

Note further that xyP can serve as a session key. Also, the session key could be any known function of xyP. That is, the session key could equal f(xyP), where f is known to both parties and is not required to be secret (i.e., known to the world). One practical requirement on f should be that f(xyP) is hard to compute without knowledge of x or y, and the output is of a satisfactory length from a cryptographic perspective, e.g., around 128 bits or more.

Some of the properties of the IBAKE protocol include:

Immunity from key escrow: Observe that all the steps in the protocol exchange are encrypted using IBE. So clearly the KGF can decrypt all the exchanges. However, the KGF cannot compute the session key. This is because of the hardness of the elliptic curve Diffie-Hellman problem. In other words, given xP and yP, it is computationally hard to compute xyP.

Mutually Authenticated Key Agreement: Observe that all the steps in the protocol exchange are encrypted using IBE. In particular, only B can decrypt the contents of the message sent by A in the first and third steps, and similarly only A can decrypt the contents of the message sent by B in the second step. Moreover, at the end of the second step, A can verify B's authenticity since xP could have been sent in the second step only after decryption of the contents in the first step by B. Similarly, at the end of the third step, B can verify A's authenticity since yP could have been sent back in the third step only after correctly decrypting the contents of the second step and this is possible only by A. Finally, both A and B can agree on the same session key. In other words, the protocol is a mutually authenticated key agreement protocol based on IBE. While the above description provides the motivation for the security of the protocol, a cryptographic proof of security can be easily provided. The hardness of the protocol relies on the hardness of the Elliptic curve Diffie-Hellman problem, which is influenced by the choice of elliptic curve.

Perfect forward and backwards secrecy: Since x and y are random, xyP is always fresh and unrelated to any past or future sessions between A and B.

No passwords: the IBAKE protocol does not require any offline exchange of passwords or secret keys between A and B. In fact, the method is clearly applicable to any two parties communicating for the first time through any communication network. The only requirement is to ensure that both A and B are aware of each other's public keys, for example, through a directory service.

Further details of the IBAKE protocol are described in IETF Internet-Draft authored by V. Cakulev et al. and entitled "IBAKE: Identity-Based Authentication Key Exchange," Apr. 20, 2011; and IETF RFC 6267 authored by V. Cakulev et al. and entitled "MIKEY-IBAKE: Identity-Based Authenticated Key Exchange (IBAKE) Mode of Key Distribution in Multimedia Internet KEYing (MIKEY)," June 2011, the disclosures of which are both incorporated by reference herein in their entireties.

II. Secure Group Messaging

As will be explained in detail herein, embodiments of the invention provide end-to-end key management solutions utilizing identity based cryptography that allow participants to encrypt messages end-to-end while simultaneously ensuring that networks in the middle do not have access to key material. For example, the IBAKE protocol described above is used in illustrative embodiments described herein below.

The solutions provided herein are also highly optimal in the context of the computing resources needed in the network— specifically, the messaging provider provides a key management server (KMS) that will be sparingly used (and hence will be automatically highly available), with no requirements to do any cryptographic processing in the network to support the security service on a per message basis. It is to be understood that the KMS performs, inter alia, the operations of the KGF described above in section I. Moreover, the solutions apply to a host of scenarios including, but not limited to, peer-to-peer (P2P) messaging, group messaging, message boards, multimedia messaging, etc.

We now describe some assumptions for the illustrative embodiments described herein. It is to be understood, however, that these assumptions are not intended to be limiting and thus alternative embodiments may be realized with one or more alternative assumptions.

Consider a Group of Friends (GoF) including a set of N users in a communication system. Note here that "friend" is intended to have a broad connotation, i.e., select individuals in an enterprise (e.g., business, company, venture, organization, etc.) or non-enterprise environment (e.g., social networking). This group is either known in advance, or is created in an adhoc manner. Assume that each member of this GoF wishes to securely exchange messages with any other member of this GoF as well as post a message on a message board to which only members of this GoF can read and respond. The security assumptions for this illustrative description include:

Members of a given group are not expected to exchange any key material (out of band) in advance of P2P or group communications between themselves. It is to be understood that "out of band" means a separate dedicated session just between peers or participants, prior to the P2P or group messaging session. By way of example only, Alice and Bob, as peers, could talk over the telephone and agree on a password before using it in some form to encrypt messages. That telephone exchange would be out of band.

Any infrastructure support that the messaging provider offers, to enable security, is scalable and lightweight compared to existing network security solutions.

Any member of a given group can send or post messages, independent of who else is online. Hence, messages may be stored on a server (or network element); however, the server that stores the message is not able to decrypt messages. More generally, the messaging provider is not able to decipher messages exchanged between subscribers in any group.

Security associations and P2P keys between any two members of the group are unique to those two members. This facilitates group members to engage in "secure private messaging" independent of the group.

Security associations related to group communications and related group keys are unique to that group with the provision to modify keys as the group expands or contracts. In fact, keys can be updated "regularly" (based on a security policy—e.g., daily) even if the group membership is not altered.

Only authenticated and authorized members are able to send and receive messages. Moreover, any recipient of a message is able to "verify" the author of the message.

P2P Messaging: We treat P2P messaging as a special case of group messaging consisting of a group of 2 members, with the group key being the same as the P2P key.

The following use cases provide a framework to understand the problems addressed and the proposed solutions below. However, these use cases are in no way limiting and are intended only to facilitate an understanding of the illustrative embodiments:

1. General use case: Assume that a group of friends, in an enterprise, post messages on a message board and communicate with each other independently. Embodiments herein address how to make messaging secure such that a message board does not learn the contents of the messages. Moreover, any two group members can send and receive messages with each other independent of the group in such a way that other group members cannot decipher the messages. This latter requirement is equivalent to a "secure private side-bar" messaging exchange.

2. Illustrative application: Assume that a service provider hosts a messaging service in a hospital environment, i.e., a nurses station sends a group message to a set of doctors to respond (not all doctors) regarding a specific patient. This may involve a "link" to records (which is online). In this case, the group of doctors who form the group will be configured when a particular patient is admitted into the system. As the patient is treated, the group of nurses and doctors may expand or contract. Once the patient is treated and discharged, that group no longer exists.

3. Ad-hoc messaging: Two friends exchange messages with each other and decide to invite other friends to the conversation in an ad-hoc manner. In this setting, all messages are secured using a group key with the provision to update keys to accommodate expansion of the group. We call this ad-hoc group messaging.

We now describe a secure group messaging framework and solution according to an illustrative embodiment of the invention. We begin with a formal description of the problem, following which we describe the identity based cryptographic framework and the related assumptions that we make towards addressing the problem. Subsequently, we present the secure group messaging framework and solution.

Consider a set of N users $\underline{U}_N = (U_1, U_2, \ldots, U_N)$ who form a "Group of Friends." Each user $U_i$ wishes to exchange messages only with "friends," where a friend is considered to be any user $Uj \in \underline{U}_N$ that is affiliated with $U_i$ and is authorized to securely receive $U_i$'s messaging information; Uj and friends are considered to form a Group of Friends (GoF). Messages are exchanged by utilizing a messaging service infrastructure, which provides security association establishment support among members of GoF. A friend may be online or offline at any instant of time. In other words, not all members of GoF are necessarily online at the same time in order to participate in a potential group based security association establishment procedure. Given this set-up, embodiments of the invention provide methodologies/protocols that secure messages exchanged among members of GoF. That is, in terms of notation above, embodiments ensure that information shared by $U_i$ is exchanged securely, and obtained only by an authenticated set of (friend) users. Also, embodiments allow the friends (if needed) to verify that the received information is indeed provided by $U_i$.

As mentioned above, the secure group messaging protocol according to an illustrative embodiment advantageously does not require participants to have exchanged any security credentials out of band between themselves in advance of communications, and the key management infrastructure support offered by the provider is lightweight and scalable.

To provide these advantages, illustrative embodiments use an identity based cryptographic framework based on identity based cryptographic protocols described above in section I. Aspects of the IBE framework include:

1. Every participant (i.e., client in our case) has a public key and a corresponding private key.

2. All public keys are based on identities (such as phone numbers, login identifiers, Session Initiation Protocol (SIP) handle), thereby eliminating the need for expensive Registration Authorities (RAs) and Certificate Authorities (CAs).

3. Private keys are computed by a key management server (KMS) that is typically owned and operated by the provider. KMS could also be owned by a third party provider who provides secure managed services. Moreover, the KMS publishes public parameters that are used in cryptographic operations and create a binding with the provider.

4. Public keys also include a "date" which allows for public keys (and corresponding private keys) to expire automatically. This practically eliminates the need for revocation and related infrastructure. For instance, the public key could be as simple as "ID|today's date" which by definition expires at the end of the day.

5. Every participant contacts the KMS periodically (e.g., once a month) and obtains a set of keys for an extended period (e.g., next 30 days, or duration of subscription).

6. Any participant can encrypt information to anyone else, by using the recipient's public key for that date and the public parameters of the recipient's KMS. Conversely, the recipient decrypts the information based on the private key for that date. The sender is guaranteed that only the recipient can decipher the information sent. In this identity based encryption framework, only the recipient and the KMS are able to decrypt.

7. While the above IBE framework allows for scalable and lightweight public key cryptography, the shortcomings include: the absence of mutual authentication between client, and the fact that the KMS is able to decrypt every encrypted message (i.e., the KMS is an inherent natural escrow point).

8. These shortcomings are addressed in the above-described IBAKE protocol which provides mutual authentication and protection from passive key escrow.

Embodiments of the invention adopt the IBAKE protocol in the secure group messaging protocol which we now describe. In this embodiment, we make the following assumptions related to the problem statement that we wish to address:

1. All N users are assumed to have a pair of keys (an IBE private and an IBE public key), which correspond to a specific user identity. User $U_i$'s IBE private key $K_{PRi}$ is kept secret by $U_i$, while the corresponding public key $K_{PUBi}$ is made available to all N users.

2. We assume that there exists an offline mechanism with which GoF is formed.

3. The messaging network operator is aware of the GoF formation(s). Note that, in the general case, there may be only a single GoF, involving all users in the system.

4. GoF members do not want the messaging network operator to be able to obtain the information contained within the exchanged messages.

5. GoF members trust the messaging network operator and use the KMS offered by the messaging provider which is trusted not to disclose private user information, including IBE private keys.

In this embodiment of the secure group messaging framework, we first describe the case where the GoF includes two members, Alice and Bob (where Alice refers to a computing or client device of a party A, and Bob refers to a computing or client device of a party B). Subsequently, we expand the description to include scenarios where more than two users comprise a GoF.

As used below, E(k, A) denotes that information A is encrypted with the public key k, and s||t denotes concatenation of the strings s and t.

A. Case Where GoF Includes Two Members (P2P Messaging Case)

FIG. 1 illustrates a communication system 100 implementing secure group messaging according to an embodiment of the invention. As shown, system 100 shows a first computing device (Alice) 102, a second computing device (Bob) 104, a key management server (KMS) 106, a key management agent (KMA) 108, and a messaging server 114.

While KMS 106 and KMA 108 are shown as separate servers, they could be implemented on the same server, or on more than two servers. For example, the KMS and the KMA functionality could be implemented in the same server complex, but in a geographically distributed fashion. For instance, a client could be connected to a KMS functionality in New York (due to a billing address of the client) for monthly private keys. But on a given date, the client could be travelling and hence connected to a KMA functionality in California. Various other implementations will be realized given the detailed descriptions herein.

Also, while only one messaging server is shown in system 100, it is to be understood that there may be two or more messaging servers operated by one or more messaging providers. Still further, while FIG. 1 shows only two participants/members (Alice and Bob), the system 100 will typically include a larger number of participants/members. Thus, as mentioned herein, the P2P messaging scenario includes just two members in the GoF, while the group messaging scenario includes two or more members in the GoF.

In this embodiment, Elliptic Curve Cryptography (ECC) is employed as a mechanism for establishing security associations amongst members of one or more GoF. To that extent, we consider that each user $U_i$ can perform identity based encryption of a piece of information using an IBE public key, and can decrypt an IBE-encrypted message destined to $U_i$ using the corresponding IBE private key. These calculations involve operations performed on a known super-singular elliptic curve over a finite field. Additionally, the setup includes the use of a known point P on a known Elliptic curve E which is not super-singular, which is used to perform key agreement.

As shown in FIG. 1, it is assumed that the GoF includes Alice 102 and Bob 104, i.e., Alice and Bob are the set of users that have subscribed to a secure messaging service.

KMS 106 is the server that securely calculates and distributes IBE private keys to end users, given specific public identities (see, e.g., the above-incorporated RFC267). It is also assumed that all participants in the system are aware of the public parameters of KMS 106. An exemplary method may be to preload such parameters into a client (similar to public keys of certificate authorities) or obtain them from public databases. Moreover, the KMS 106 also serves as a repository to save various key components, as will be further explained below, pertaining to different user identities and dates. Given this setup, the basic interactions between a client (Alice 102 or Bob 104) and the KMS 106 (in the secure messaging context) are as follows.

The client (Alice 102 or Bob 104) requests and obtains private keys from the KMS 106 periodically (e.g., once a month, or once per subscription duration). The number of such private keys depends on a given security policy, and in order to ensure that we practically eliminate the need for revocation, a useful example is to use one key per day (e.g., 30 keys for a month all obtained in one transaction). However, embodiments of the invention are not limited to any such periodicity. Line 110-A denotes IBE private key provisioning for Alice 102 and line 110-B for Bob 104.

Additionally, every client generates a cryptographically secure pseudorandom number "x" (e.g., one per day) and computes the value of xP (as described above in section I) on the known non super-singular elliptic curve E and deposits them in the KMS 106. This value xP serves as that user's key component for that day. For instance, when the security policy involves session keys being refreshed once per day and client interactions with the KMS are once per month, the client calculates thirty values of xP and deposits them in the KMS. Note that even though the KMS has xP and P, it is computationally difficult to compute x since the Elliptic Curve Discrete Logarithm is hard to solve. Note also that xP is a given client's Diffie-Hellman key component. Also note that the values of xP have to be shared with the KMS in a secure manner. This is needed to ensure that all participants can perform proxy based mutual authentication. While one KMS is shown in FIG. 1, it is to be understood that each client (Alice 102 and Bob 104) could communicate with a different KMS, wherein the two KMSs could communicate in a secure manner with each other if needed.

KMA 108, in one or more embodiments, is a logical network element (or software component that is actualized in a server) that is a proxy for all key agreement transactions. Specifically, this proxy agent performs the role of the "responder" in an IBAKE transaction (see section IB above) and enables the establishment of an end-to-end key, even though the responder is not necessarily online. This functionality is achieved as follows.

This agent 108 obtains all 'xP' values of all members in the GoF for a particular day (where P is a commonly agreed point on a NIST elliptic curve E, while 'x' is a large random number (see, e.g., the above-incorporated RFC 5091)). Note that for a given client, the same value of xP is used across all members of the GoF (which may be the address book in the case of P2P messaging) for a given date. Also, this is just an example and, in general, the duration of validity of a given value of xP is a security policy and is determined by the messaging provider.

It is assumed that KMA 108 is aware of the already formed GoF. In other words, KMA 108 is aware of the users and their memberships in various groups that have subscribed to the secure message service and are thereby authorized to receive cryptographic material used for establishing security associations with other GoF members.

KMA 108 performs the functionality of the IBAKE responder client, performing the IBAKE protocol with each member in the GoF. Specifically, each member of the GoF securely communicates with KMA 108 once a day, and obtains the 'xP' values of all other GoF members for the specific date across all groups that the given initiator client is a member. In the context of P2P messaging, we may use the "address book" as a mechanism to determine whose values of "xP" a given initiator client should obtain from the KMA 108.

In the scenario depicted in FIG. 1, Alice 102 and Bob 104 separately perform IBAKE with KMA 108. Line 112-A denotes IBAKE authentication for Alice 102 and line 112-B for Bob 104. Via the established security association, Alice obtains Bob's 'bP' value; similarly Bob securely obtains Alice's 'aP' value for the specific day (e.g. "today"). Given that an 'xP' value (x={a, b} in FIG. 1) is valid for the duration of a day, each GoF member needs to securely contact KMA 108 at most once per day. Note that Alice 102 and Bob 104 need not be online at the same time, and their respective transactions with the KMA 108 may take place at different instances of time.

As explained above, Alice 102 and Bob 104 each obtain each other's 'xP' value from KMA 108, via the individual secure connections with the latter, which are established using two separate IBAKE procedures (e.g., as per the above-incorporated RFC 6267). Furthermore, Alice 102 computes the value 'abP', while Bob 104 computes 'baP' (which is identical to abP), which are the "session" key (also referred to below as the GoF key) for the specific date. As a consequence, Alice 102 and Bob 104 end up deriving a GoF key known only to them. No other entities shown in FIG. 1 can obtain the value of the GoF key that Alice and Bob each compute. It is to be understood that the session key could also be derived as a function of abP (baP) as explained above in section IB.

Note that Alice 102 does not perform IBAKE with Bob 104. Each of Alice and Bob perform IBAKE only with KMA 108, once per day (or whatever is the predetermined period). Given this, Alice 102 and Bob 104 are mutually authenticated to each other through the trusted agent (KMA 108). Note that trust in the agent is really established through the KMS 106 (which is the basis for all of the identity based cryptography). Alice 102 trusts KMA 108 to authenticate Bob 104 through the corresponding IBAKE procedure. Similarly Bob 104 assumes that Alice 102 has been authenticated by KMA 108 via IBAKE. While one KMA is shown in FIG. 1, it is to be understood that each client (Alice 102 and Bob 104) could communicate with a different KMA, wherein the two KMAs could communicate in a secure manner with each other.

The GoF key that is commonly computed by Alice 102 and Bob 104 ('abP') is used to further protect messages transferred between Alice and Bob via one or more messaging servers (114 in FIG. 1). If Bob manages to decrypt a message that is encrypted by Alice using the common GoF key, then Bob (implicitly) verifies Alice's identity, since she is the only one supposed to be in possession of the GoF key (again, given that KMA 108 is a trusted entity). In particular, if Eve (another computing device—not shown in FIG. 1) is not part of a given GoF, she cannot obtain the values of the ECDH (Elliptic Curve Diffie Hellman) key components for any of the group members.

Advantageously, with this solution, users engage in a shared GoF key derivation process without having to be constantly online. Indeed, Alice 102 and Bob 104 contact KMA 108 and compute a GoF key once a day. They may then go offline and get back online at their convenience. In one implementation, the IBAKE session between the client and the KMA can be run "once a day" (or be tailored to meet security requirements) without the user intervening in the transaction and can be automated. Whenever Bob 104 comes online, he can use the computed GoF key for the particular date in order to decrypt any received messages from Alice 102 while he was offline. Note also that Bob may decide to go offline potentially for many days. As soon as he comes online, he may request the 'xP' value from KMA 108 for all GoF members (or people in his address book for P2P messaging), calculate the corresponding GoF key, and subsequently decrypt all incoming messages. Observe that, when Alice 102 wants to contact David (yet another computing device—not shown) who is not in her address book, she could go obtain the value of xP that David has stored with the network by contacting the KMA 108 on a need-to basis. The solution can be extended to support use-cases where David could create black lists, and anyone in the black lists may not be able to obtain David's key component xP for that date.

This solution addresses the problem of passive key escrow. In other words, with this solution, the messaging network operator is not able to decrypt the information contained in individual messages exchanged among GoF members, although the operator knows the IBE private/public keys of users (since the operator potentially owns KMS 106 and KMA 108). Observe that when Alice 102 and Bob 104 are messaging with each other, they use the session key abP. As explained herein, the KMS 106 and KMA 108 are aware of aP and bP but in view of the Diffie-Hellman problem on E, neither entity can compute abP.

B. Case where GoF Includes More than Two Members

The case where GoF is comprised of more than two members is very similar to the above case of only two members. The main differences are in the type of information that is exchanged between KMA 108 and each GoF member, as well as in the derivation of the GoF key. Note that with group messaging, all GoF members derive the same key; hence a message that is encrypted by a group member (e.g., Alice 102) can be decrypted by every other group member. The public keys could include the group-identity in addition to the client identity prior to concatenation with the date.

More specifically, whenever a GoF member communicates with KMS 106 and KMA 108, the following information is obtained:

Each group member computes the value of $Z_i = x_i P$, as in the case of P2P messaging, where P is a commonly agreed point on a NIST elliptic curve E, as described above. Recall that P, E, as well as other public parameters are freely available, while $x_i$ is the random number corresponding to the specific GoF member for that date. As in the P2P messaging situation, every group member deposits multiple values of these DH key components (example one per day). This allows any member to contact the KMA 108, and obtain the DH key component values/of all GoF members. This step is identical to the case described in the P2P messaging case.

In addition to $Z_i = x_i P$ (where the subscript represents the i-th user), each member will also calculate the value of $X_i = x_i(x_{i+1}P - x_{i-1}P)$ and store it in the KMS 106 (one per day or multiple values in general) after obtaining the values of $x_{i+1}P$ and $x_{i-1}P$ from the KMS 106. Alternatively, these transactions could be performed with the KMA 108 directly when the client "logs in" to the KMA 108 once a day—wherein the security association between the client and KMA will include an IBAKE transaction (as in the P2P messaging set up).

Note that, there may be situations when one or more values of Xi are not current at the KMA 108. In such instances, an older value is used (until updates are provided). However, given that all participants use a "group identity" along with their personal identities, the probability of one or more values of Xi being stale can be dramatically minimized by forcing every group member (in a given group) to communicate with the KMS 106 and perform all relevant transactions around approximately the same time (e.g., within a day or two of each other and well in advance of the use of fresh private keys). Alternatively, additional group members may be admitted temporarily in to the GoF by anyone who is online by sharing the current group key with the new member using the P2P key that exists between the online member and the new member.

On a daily basis, the KMA 108 provides each GoF member with the stored values of Zi, and $X_i$ of every other member (or periodic basis as dictated by the security requirements). More specifically, whenever Alice 102 contacts KMA 108, she securely obtains both $Z_i$ and $X_i$ values of every other GoF member.

Given this, a GoF member $U_1$ encrypts message $D_1$ using key $K_1$ which is derived as per the following formula (where N is the number of users in the group or cardinality of GoF):

$$K_1 = Nx_1(Z_N) + (N-1)X_1 + (N-2)X_2 + \ldots + X_{N-1}.$$

Note that for such encryption, any symmetric cipher (such as Advanced Encryption Standard or AES) can be used. By encrypting $D_1$, $U_1$ creates ciphertext $C_{D1}$ and sends it to all other GoF members through the access network (e.g., via messaging server 114 in FIG. 1). Users $U_2, \ldots, U_N$ belonging to GoF can decrypt $C_{D1}$ by using a key that is calculated locally by each of them. Specifically, each user $U_i$ from the N−1 users calculates the same key $K_i$ as follows:

$$K_i = Nx_i(Z_{i-1}) + (N-1)X_i + (N-2)X_{i+1} + \ldots + X_{i-2}.$$

This key is further used by the corresponding GoF member to decrypt the message, using the same cipher as the one used for encryption.

Figure 2:
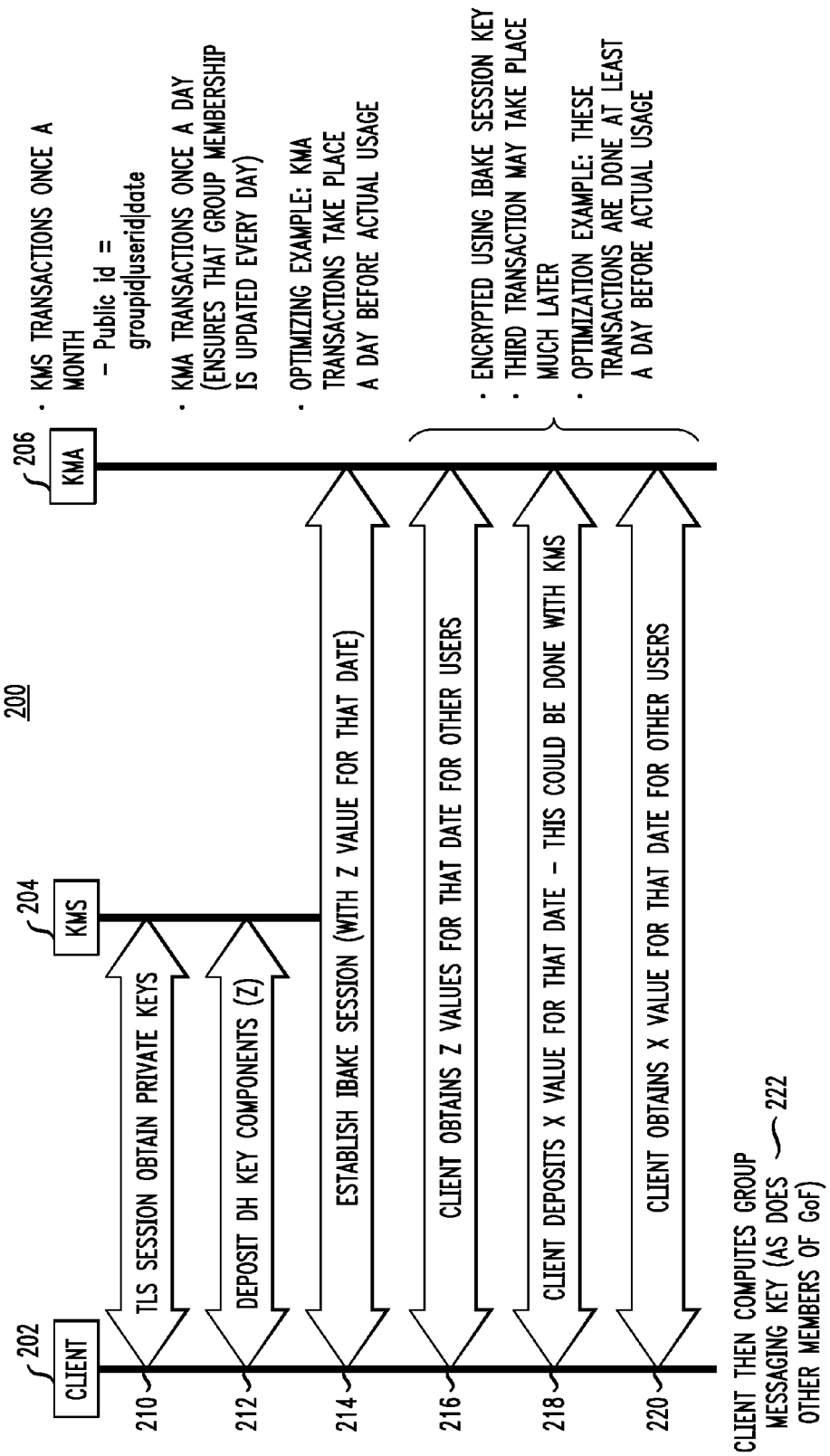
FIG. 2 illustrates a secure group messaging methodology with identity based cryptography according to an embodiment of the invention.

Turning now to FIG. 2, a secure group messaging methodology (protocol) 200 with identity based cryptography is illustrated according to an embodiment of the invention. The methodology is illustrated from the perspective of one client 202 (e.g., Alice 102 or Bob 104), KMS 204 and KMA 206 (note that KMS 204 functions as described above with respect to KMS 106, while KMA 206 operates the same as KMA 108). FIG. 2 illustrates the group messaging scenario (with more than two GoF members).

It is first assumed that a GoF has been created or defined. Each member of the GoF uses their unique identity and group identity (identity of created GoF) along with a date (all concatenated) to derive a public key. The public key (public id) of a group member can thus be calculated as groupid|userid|date.

In step 210, the client 202 sends his public key to KMS 204 and obtains one or more private keys from KMS 204. This step corresponds to the private key provisioning depicted via lines 110-A or 110-B in FIG. 1. In one embodiment, the private keys may be obtained by the client from KMS 204 via a Transport Layer Security (TLS) session.

In step 212, the client 202 deposits DH key components (Z) with KMS 204. These components are the xP (or aP or bP mentioned above) values that the client computes as described above. They may be computed and deposited for all days in a month (depending on periodicity). That is user "i" will deposit $Z_{ij} = a_{ij} P$ for j=1 to 30 one per day).

Then, in step 214, the client 202 establishes an IBAKE session (with Z value for that date) with KMA 206.

From KMA 206, in step 216, the client 202 obtains Z values for that date for other members in the GoF. That is, KMA 206 sends $Z_{i-1,j}$ and $Z_{i+1,j}$ back to user "i" for all dates "j".

In step 218, the client 202 computes his X value (his session key contribution or group key component) for that date and deposits it with KMA 206 (note that this could alternatively be done with KMS 204). That is, user "i" sends back to KMA 206 $X_{ij} = a_i(Z_{i+1} - Z_{i-1})$.

In step 220, the client 202 receives from KMA 206 the X values for that date for other users (i.e., client 202 receives the session key contribution or group key component of each other user).

The client 202 then, in step 222, computes the group session key (e.g., Group Key=$Nx_i(Z_{i-1}) + (N-1)X_i + (N-2)X_{i+1} + \ldots + X_{i-2}$), as does each other participating user, and can then encrypt messages to other users using the group session key. Thus, for example, SMS/MMS messages between group members are encrypted with AES using the group session key. These messages are communicated between members via the messaging server 114 (FIG. 1). Note that the group session key is not known to KMA 206 or KMS 204. i.e., only authorized group members can calculate group key. Also, group members can send encrypted messages in any given day without waiting for others to come online. Note that the group session key (also known as the GoF key) derived in this scenario may be considered a "group messaging key."

In the non-limiting example shown in FIG. 2, KMS 204 transactions can be performed once a month. KMA 206 transactions can be once a day thereby ensuring that group membership is updated every day. Further, for step 216 through step 220, it is to be understood that in this embodiment the transferred messages are AES encrypted using an IBAKE session key. Still further, step 220 can take place at a time much later than steps 216 and 218. Optimizations may be implemented. By way of example only, KMA transactions can be performed a day before their actual usage.

Figure 3:
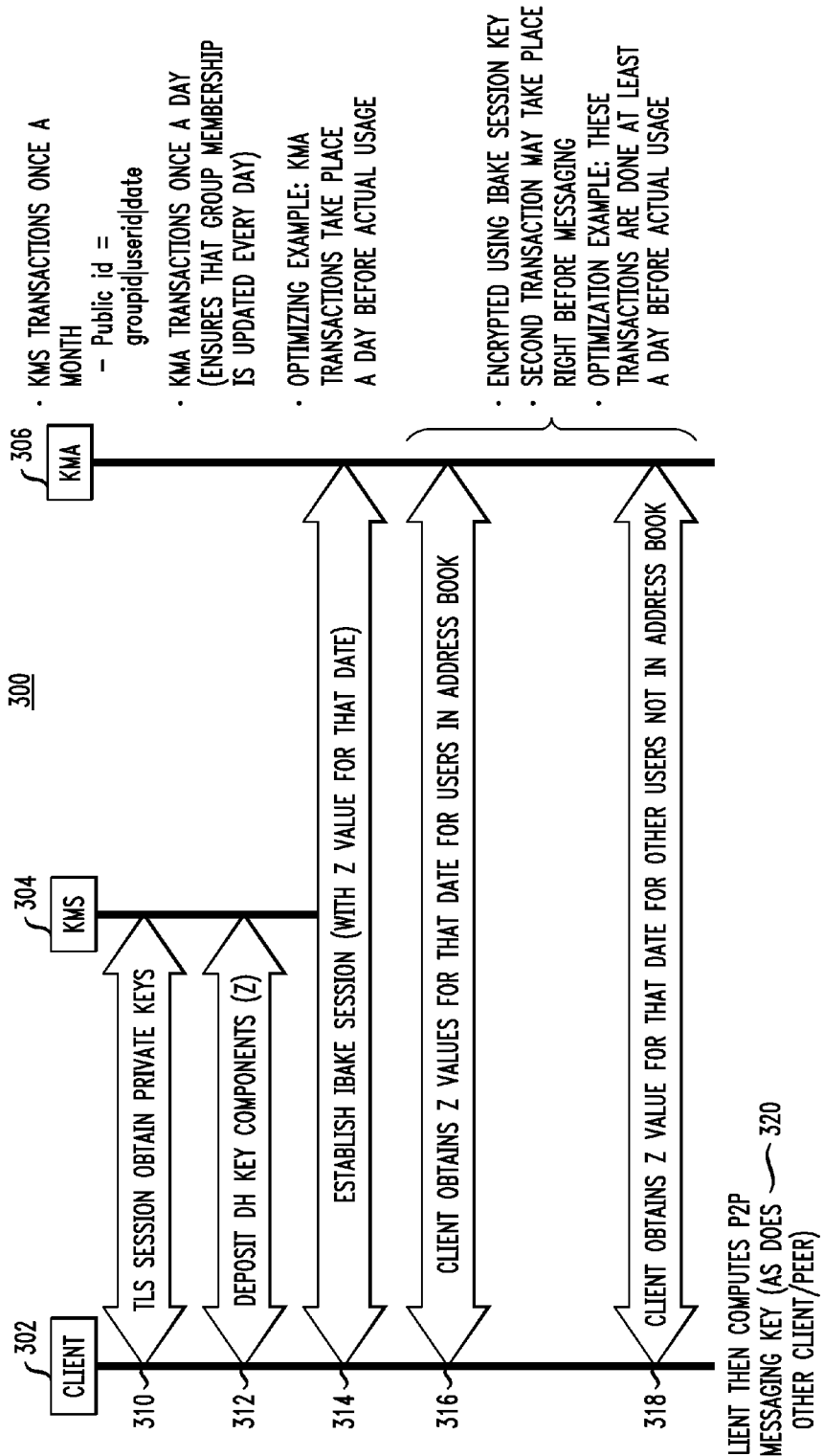
FIG. 3 illustrates a secure group messaging methodology with identity based cryptography according to another embodiment of the invention.

FIG. 3 illustrates a secure group messaging methodology (protocol) 300 with identity based cryptography according to another embodiment of the invention. It is to be appreciated that FIG. 3 illustrates P2P messaging (two members in the GoF). Thus, methodology 300 may be considered a special case of methodology 200. Like FIG. 2, the methodology 300 is illustrated from the perspective of one client 302 (e.g., Alice 102 or Bob 104), KMS 304 and KMA 306 (note that KMS 304 functions as described above with respect to KMS 106, while KMA 306 operates the same as KMA 108).

Note that steps 310, 312 and 314 operate the same as steps 210, 212 and 214 in FIG. 2, and thus are not further described.

Since there is only one other member in the GoF in the P2P case, client 302 and the other member or peer in the given peer-to-peer session compute a session key (GoF key) from the other parties Z value (xP value). This computation is the same as what is explained in section IB above, i.e., each peer computes xyP and this is used as the session key (or used to derive a session key as an input to a function, as explained above).

Thus, in the protocol 300 of FIG. 3, after the IBAKE session is established between client 302 and KMA 304, client 302 can obtain the Z values from KMA 304 for that date for users in the address book of client 302 in step 314. Presumably, the peer that client 302 wishes to message (e.g., Bob) is listed in his address book stored on his device. If not, in step 318, client 302 can obtain values from KMA 304 for that date for users not in the address book of client 302.

Then, in step 320, client 302 computes the session key (GoF key) for the P2P session with the other peer, i.e., in this case, xyP. The other peer would do the same. Then, SMS/MMS messages between client 302 and the other peer are encrypted with an encryption algorithm such as AES using the P2P session key. These messages are communicated between members via the messaging server 114 (FIG. 1). Note that the P2P session key is not known to KMA 306 or KMS 304. i.e., only client 302 and the other peer can calculate the session key. Also, client 302 and the other peer can send encrypted messages in any given day without waiting for the other to come online. Note that the GoF key derived in this scenario may be considered a "P2P messaging key."

An exemplary use case is as follows: On any given day, Alice would be sending messages to a number of people. Since sending a message requires contact information, address books are relevant—as a matter of optimization, when her phone wakes up for the first time in a day, the secure messaging client could just register with the KMA and obtain all values of xP for all members in her address book. Some of those values may not be used on a given day—since one does not always send messages to everyone in their address book every day. Conversely, one does send messages to people not in their address book as well. With IBAKE based secured messaging, this would require xP values for those not in the address book. However, since it is assumed that all users of the messaging service deposit their Z values with the KMS (which provides them to the KMA), then a given client could securely communicate with any of the users of the service.

Advantageously, as described above in detail, illustrative embodiments of the invention provide the following solutions and features:

(i) A lightweight identity based cryptographic solution for end-to-end secure group messaging among two or more end users that is agnostic to the access technology, which allows for two or more users to exchange messages securely without exchanging any security credentials with each other out of band prior to any messaging exchange.

(ii) In addition to standard P2P messaging environments such as SMS, MMS, and IM, the above-described solution applies to group messaging applications in a social networking environment as well as in enterprise messaging environments using a group key.

(iii) Notably, calculation of session keys (for P2P as well as group messaging applications) does not require recipients of the message(s) to be online when a message is being initiated.

(iv) The above-described solution introduces the concept of a key management agent (KMA) residing in the messaging provider's network, which obtains and disseminates cryptographic material from/to users, in such a way that the agent is not able to overhear the messaging communication. More generally, the messaging provider provides a platform for key management (through a combination of key management servers and agents as well as other back end databases and servers) but is not in a position to learn the keys that are used to encrypt any message.

(v) In addition, the above-described solution achieves perfect forward and backwards secrecy where the KMA serves as an authentication proxy while preserving privacy end-to-end.

III. Illustrative Computing System

Figure 4:
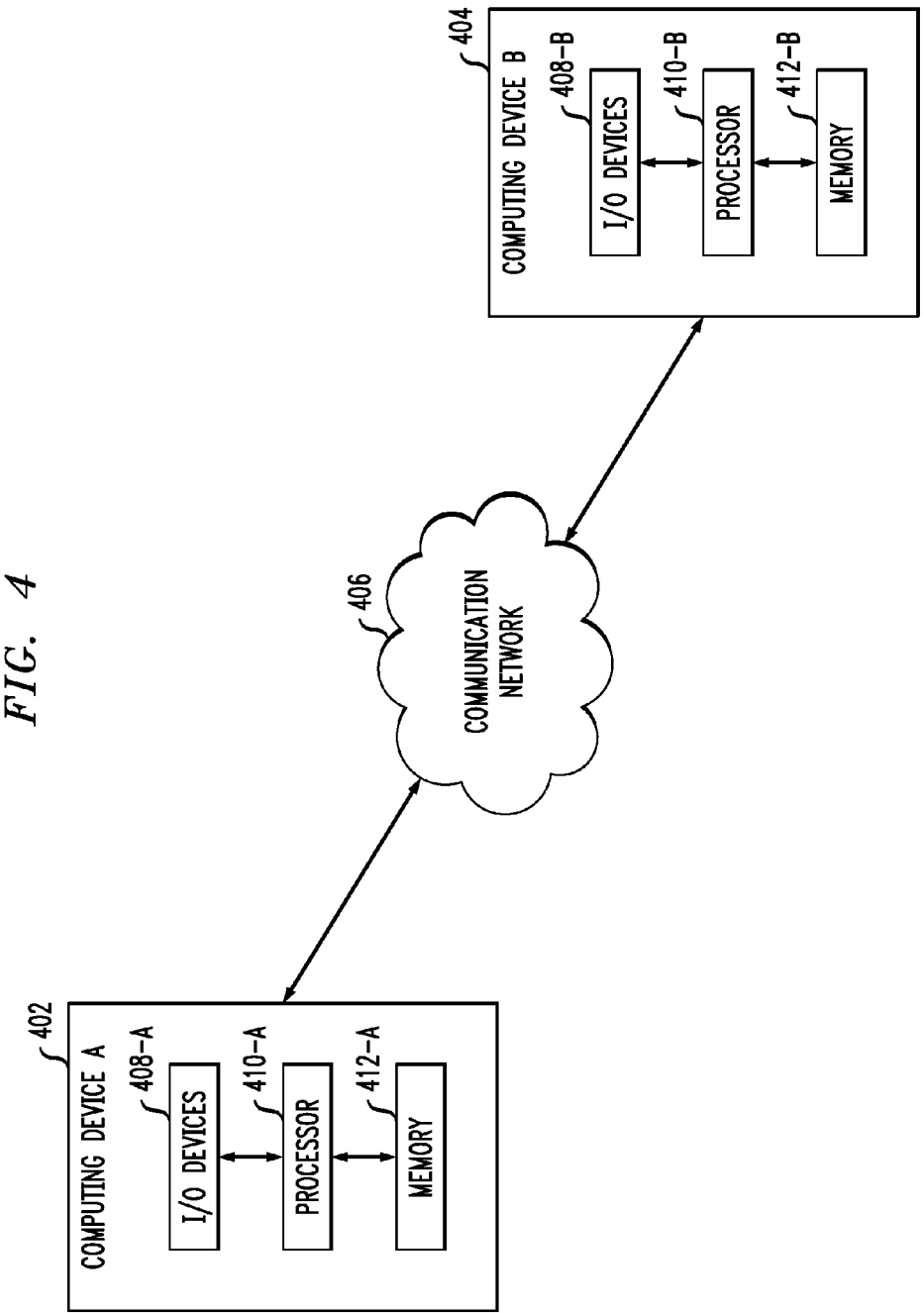
FIG. 4 illustrates a generalized hardware architecture of a data network and communication (computing) devices suitable for implementing one or more of the protocols according to embodiments of the invention.

FIG. 4 illustrates a generalized hardware architecture 400 of a network environment and communication devices in the form of computing devices suitable for implementing a secure group messaging methodology (protocol) between two or more entities (parties) according to embodiments of the present invention. While FIG. 4 shows only two entities, it is to be understood that other entities can have the same configuration. Thus, in terms of the secure group messaging protocols described above, the two entities may be Alice 102 (a first party or A) and Bob 104 (a second party or B). However, KMAs, KMSs, messaging servers, functional elements, additional client devices (parties) and additional servers may be implemented with the same architecture as shown in a computing device of FIG. 4, and thus the computing devices in FIG. 4 may represent one of these system elements. Thus, for the sake of simplicity, all the computing devices (communication devices) that may participate in the protocols of the invention are not shown in FIG. 4.

As shown, A's computing device designated 402 and B's computing device designated 404 are coupled via a network 406. The network may be any network across which the devices are able to communicate, for example, as in the embodiments described above, the network 406 could include a publicly-accessible wide area communication network such as a cellular communication network operated by a network operator (e.g., Verizon, AT&T, Sprint). However, embodiments of the invention are not limited to a particular type of network. Typically, the devices could be client machines. Examples of client devices that may be employed by the parties to participate in the protocols described herein may include, but are not limited to, cellular phones, smart phones, desktop phones, personal digital assistants, laptop computers, personal computers, etc. However, one or more of the devices could be servers. Thus, it is to be understood that the communication protocol of embodiments of the present invention are not limited to the case where the computing systems are client and server, respectively, but instead is applicable to any computing devices comprising the two network elements.

As would be readily apparent to one of ordinary skill in the art, the servers and clients may be implemented as programmed computers operating under control of computer program code. The computer program code would be stored in a computer readable storage medium (e.g., a memory) and the code would be executed by a processor of the computer. Such a computer readable storage medium may also be considered a non-transitory computer readable medium. Given this disclosure herein, one skilled in the art could readily produce appropriate computer program code in order to implement the protocols described herein.

Nonetheless, FIG. 4 generally illustrates an exemplary architecture for each computer system communicating over the network. As shown, device 402 comprises I/O devices 408-A, processor 410-A, and memory 412-A. Device 404 comprises I/O devices 408-B, processor 410-B, and memory 412-B. It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for securing at least one message transferred in a communication system from a first computing device to a second computing device in a peer-to-peer manner, the method comprising steps of:
    establishing, at the first computing device, an identity based authenticated key exchange session with a third computing device operating as a peer authenticator, the identity based authenticated key exchange session having an identity based authenticated session key associated therewith;
    obtaining, at the first computing device from the third computing device, a random key component of the second computing device, wherein the random key component of the second computing device is encrypted by the third computing device using the identity based authenticated session key prior to sending the random key component of the second computing device to the first computing device;
    computing a peer-to-peer messaging key, at the first computing device, using the random key component of the second computing device; and
    sending at least one message from the first computing device intended for the second computing device via a fourth computing device operating as a messaging server, wherein the at least one message is encrypted using the peer-to-peer messaging key prior to sending.

2. The method of claim 1, wherein the establishing, obtaining, computing and sending steps are performed while the second computing device is offline from the communication system.

3. The method of claim 2, wherein the second computing device obtains the message and decrypts the message at a time after the second computing device comes online to the communication system.

4. The method of claim 1, wherein the third computing device is a key management agent.

5. The method of claim 1, further comprising the first computing device computing and depositing at least one random key component with the third computing device or a fifth computing device operating as a key management server, wherein the random key component of the first computing device is obtained by the second computing device and used to compute the same peer-to-peer messaging key that the first computing device computed.

6. The method of claim 5, wherein the first computing device computes and deposits multiple random key components with the third computing device or the fifth computing device, wherein each of the multiple random key components corresponds to a given time period.

7. The method of claim 1, further comprising the first computing device computing and depositing at least one random key component with a fifth computing device operating as a key management server, wherein the random key component of the first computing device is obtained by the second computing device and used to compute the same peer-to-peer messaging key that the first computing device computed, and wherein the third computing device and the fifth computing device are collocated on a single server.

8. The method of claim 1, further comprising the first computing device computing and depositing at least one random key component with a fifth computing device operating as a key management server, wherein the random key component of the first computing device is obtained by the second computing device and used to compute the same peer-to-peer messaging key that the first computing device computed, and wherein the third computing device and the fifth computing device are located on separate servers.

9. The method of claim 1, further comprising the first computing device computing and depositing at least one random key component with a fifth computing device operating as a key management server, wherein the random key component of the first computing device is obtained by the second computing device and used to compute the same peer-to-peer messaging key that the first computing device computed, and further comprising the first computing device obtaining at least one private key from the fifth computing device based on a public identity associated with the first computing device.

10. The method of claim 1, wherein the random key component is a Diffie-Hellman key component.

11. An article of manufacture comprising a non-transitory processor-readable storage medium storing one or more software programs which when executed by a processor associated with the first computing device perform the steps of the method of claim 1.

12. An apparatus in a first computing device of a communication system for securing at least one message transferred from the first computing device to a second computing device in a peer-to-peer manner, the apparatus comprising a processor device operatively coupled to a memory and configured to:
    establish, at the first computing device, an identity based authenticated key exchange session with a third computing device operating as a peer authenticator, the identity based authenticated key exchange session having an identity based authenticated session key associated therewith;

obtain, at the first computing device from the third computing device, a random key component of the second computing device, wherein the random key component of the second computing device is encrypted by the third computing device using the identity based authenticated session key prior to sending the random key component of the second computing device to the first computing device;

compute a peer-to-peer messaging key, at the first computing device, using the random key component of the second computing device; and send at least one message from the first computing device intended for the second computing device via a fourth computing device operating as a messaging server, wherein the at least one message is encrypted using the peer-to-peer messaging key prior to sending.

13. A method for securing at least one message transferred in a communication system from a first computing device to a second computing device in a peer-to-peer manner, the method comprising steps of:

establishing, at a third computing device operating as a peer authenticator, an identity based authenticated key exchange session with the first computing device, the identity based authenticated key exchange session having an identity based authenticated session key associated therewith; and sending, from the third computing device to the first computing device, a random key component of the second computing device, wherein the random key component of the second computing device is encrypted by the third computing device using the identity based authenticated session key prior to sending the random key component of the second computing device to the first computing device;

wherein the first computing device is then able to compute a peer-to-peer messaging key using the random key component of the second computing device, and send at least one message from the first computing device intended for the second computing device via a fourth computing device operating as a messaging server, the at least one message being encrypted using the peer-to-peer messaging key prior to sending.

* * * * *